Figure 6:
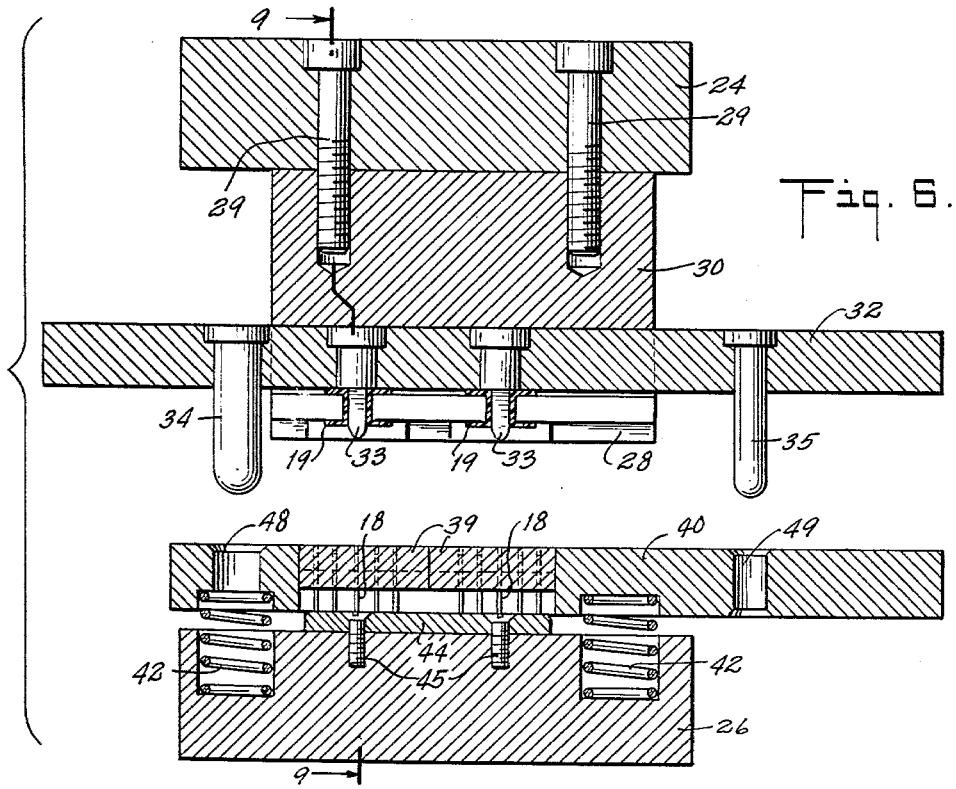

March 23, 1965 S. HORBACH 3,174,673
PIN INSERTION MACHINE
Filed Dec. 18, 1962 5 Sheets-Sheet 1
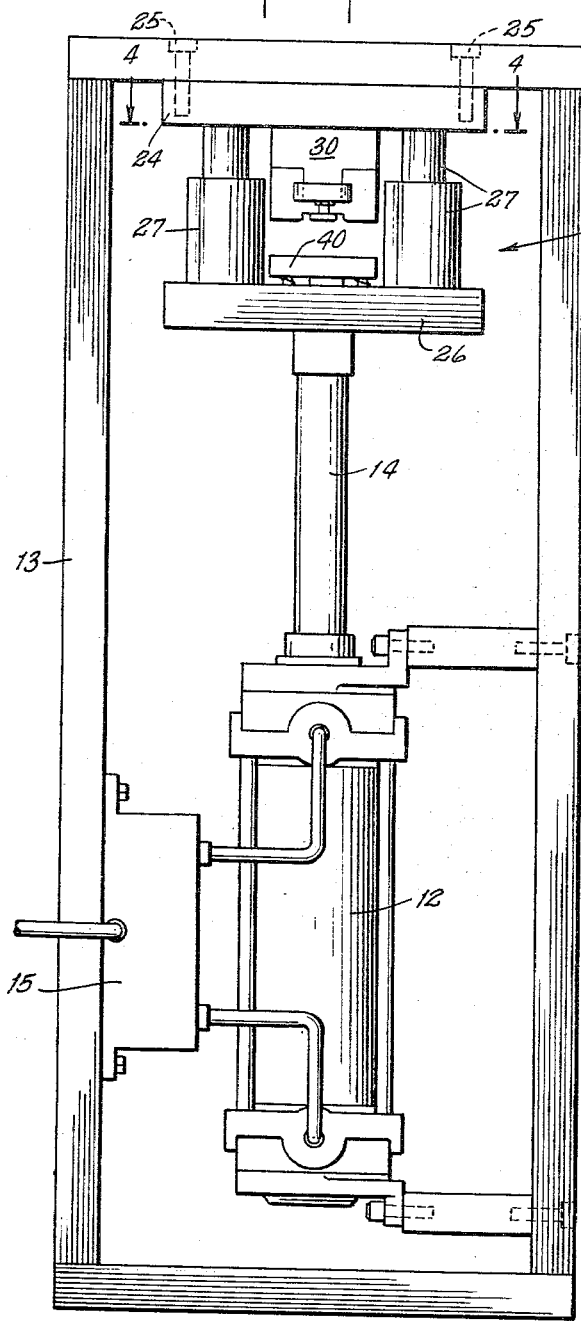
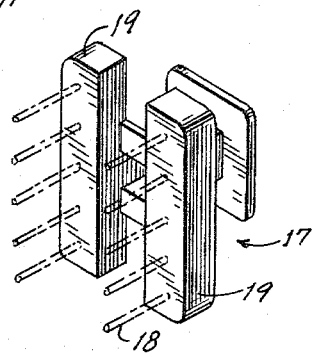
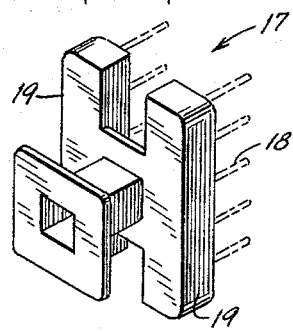
INVENTOR.
STEPHEN HORBACH
BY
Kenyon & Kenyon
ATTORNEYS

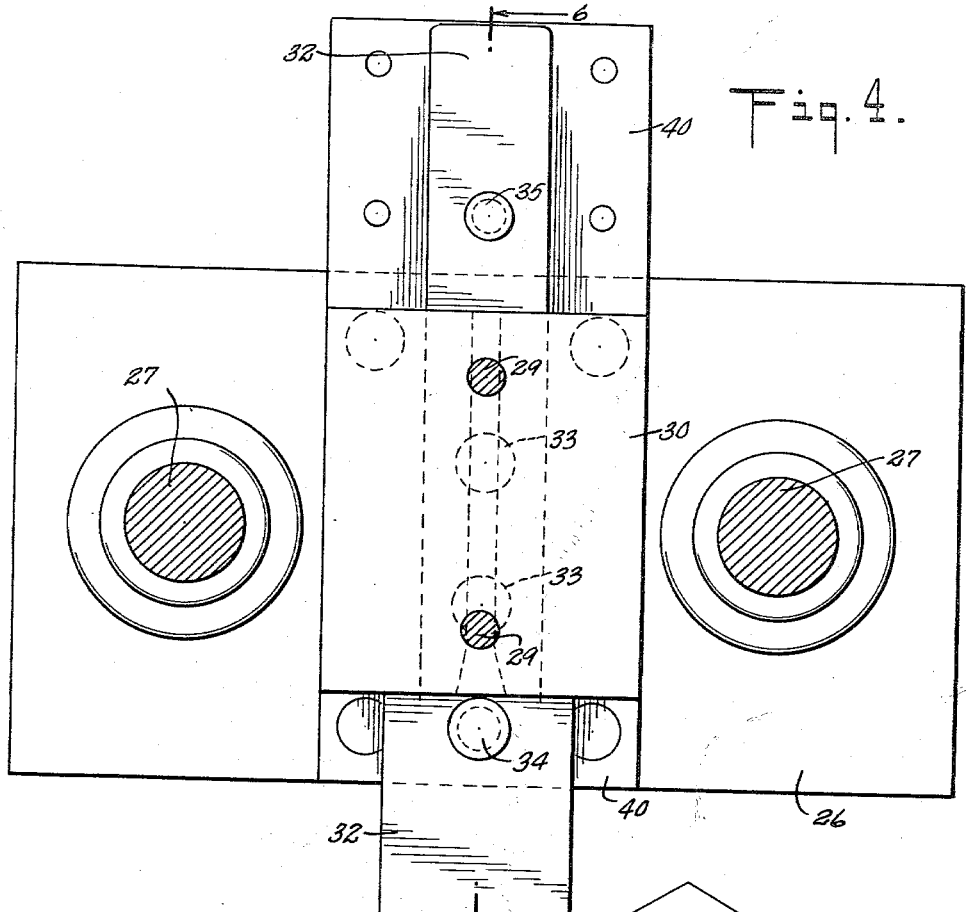
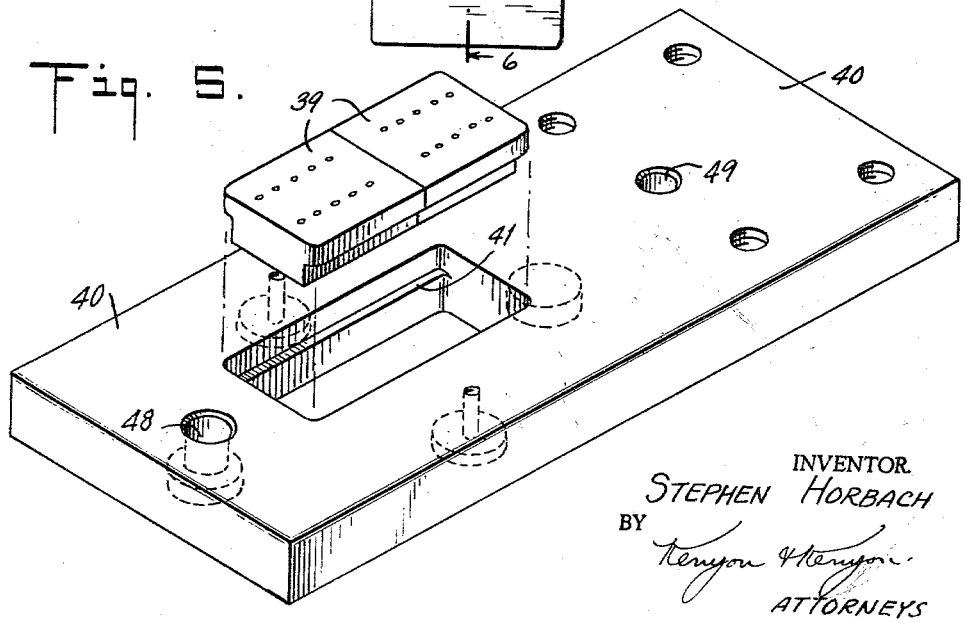

INVENTOR.
STEPHEN HORBACH
BY
Kenyon & Kenyon
ATTORNEYS

INVENTOR.
STEPHEN HORBACH
BY Kenyon & Kenyon
ATTORNEYS

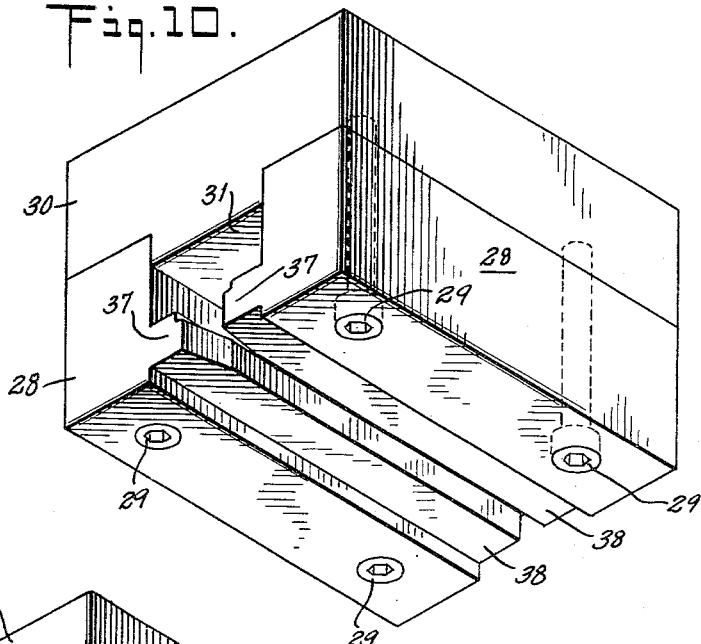
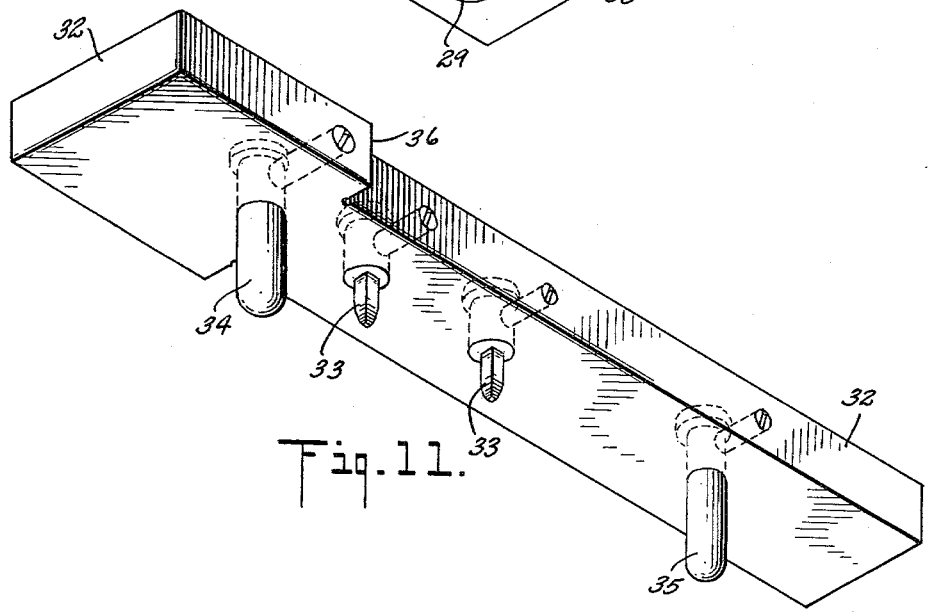

United States Patent Office 3,174,673
Patented Mar. 23, 1965

3,174,673
PIN INSERTION MACHINE
Stephen Horbach, 40 Glen Road, Mountain Lakes, N.J.
Filed Dec. 18, 1962, Ser. No. 245,554
5 Claims. (Cl. 227—154)

This invention relates in general to a pin insertion machine and more particularly to a machine that will insert terminal pins into such parts as a molded plastic bobbin.

The purposes and objects of this machine design will be most clearly understood if it is discussed in connection with the problem of inserting terminal pins into the base of a molded plastic bobbin. However, it is to be understood that the machine may have many applications beyond the one discussed. The bobbins used as a coil form in the winding of electrical coils must frequently contain terminal pins, which pins have a relatively small diameter (e.g. 13 mils) and, in comparison with their diameter, are relatively long. These pins must be firmly held in place by the base of the bobbin. The pins may be molded in or hammered into holes which are molded in the bobbin. When the pins are hammered into the base, there is an interference fit between the pin and the hole into which it is hammered so that the pin will be firmly held by the bobbin material.

The molding of the pins directly into the bobbin is a more expensive operation than if the pins are separately hammered into the bobbin. The reason being that the molding is much simpler and cheaper if the terminal pins do not have to be loaded into the mold each time a bobbin is molded. However, where the pins are separately inserted into the pin holes by a manual process, the cost of assembly is increased and the saving in the molding cost is washed out. Therefore it becomes very important to devise some machine for automatically inserting these terminal pins into the bobbins.

Accordingly, it is a major purpose of this invention to devise an automatic pin insertion machine for inserting pins by interference fit into a part such as a molded plastic bobbin.

Because the pins are very narrow in diameter and may be readily bent, it is another purpose of this invention to devise such a machine as will properly align, hold, and apply force to the pins so as to insert the pins without causing the pins to bend.

It is another important purpose of this machine that it be flexible and can be used to insert pins into a large number of different parts. This means that the machine must be able to accept a number of different items and must also be able to hold and align pins deployed in a number of different fashions.

In brief, the machine of this invention simulates what every carpenter knows to be the best technique for hammering a thin nail into a hard piece of wood. The machine, after aligning the pins with the bobbin holes, holds the pins nearly flush against the base of the bobbin and then hammers the pins into the bobbin pin holes.

The machine receives power from an air cylinder, but all standard cylinders will cause too rapid a pin insertion and thus the cylinder must have a flow control valve to slow down the travel of the cylinder. In addition, fairly heavy springs are arranged to absorb a good portion of the shock transmitted by the cylinder at the point where the cylinder starts to drive the pins into the bobbin pin holes. By holding the pins up against the holes and by pulling the punch of the cylinder with these springs, without stopping the cylinder travel, the pins are properly hammered into the bobbin base without being bent.

The pin insertion fixture has a replaceable member for holding the bobbin so that a wide variety of products may have pins hammered into them by use of this machine. The pin holding part is also replaceable so that various deployments and arrangements of pins may be provided for by replacing the pin holding part. In addition, there are various ways in which the amount of pin insertion may be varied. These techniques will be described in greater detail during the detailed description of the machine.

Figure 7:
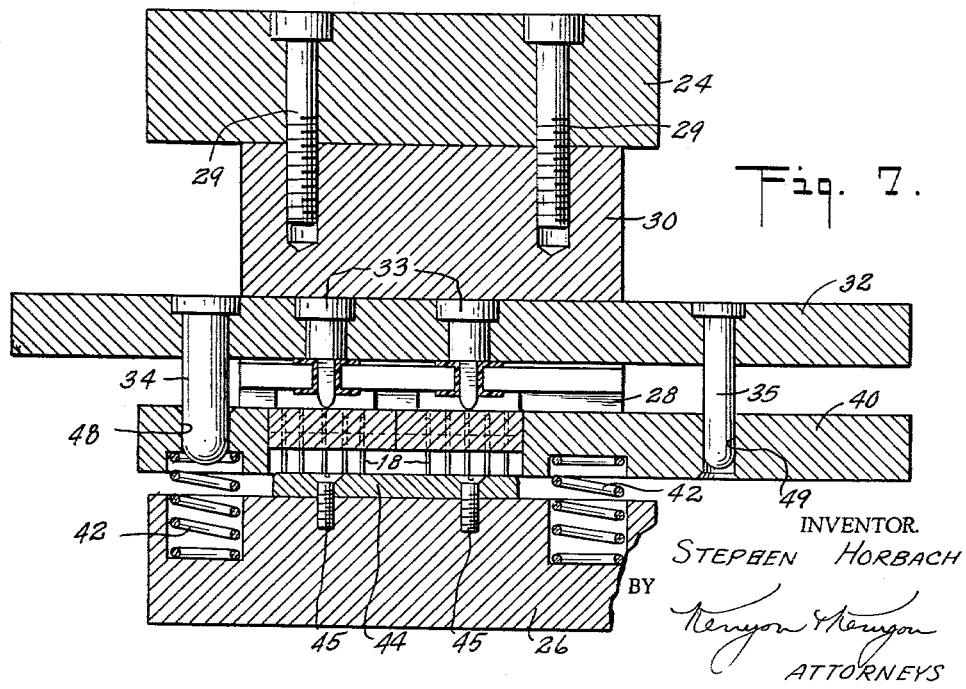
Figure 8:
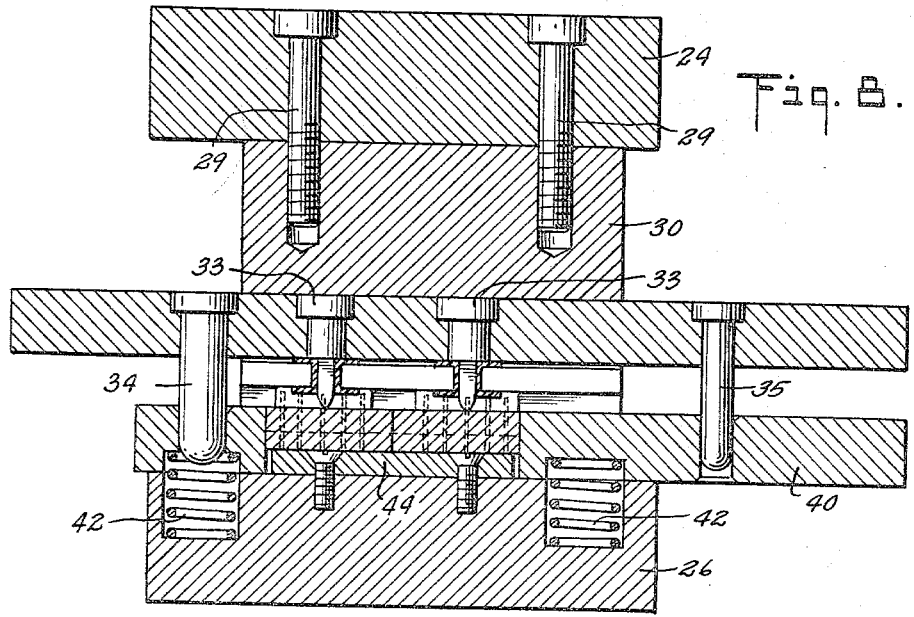
Figure 9:
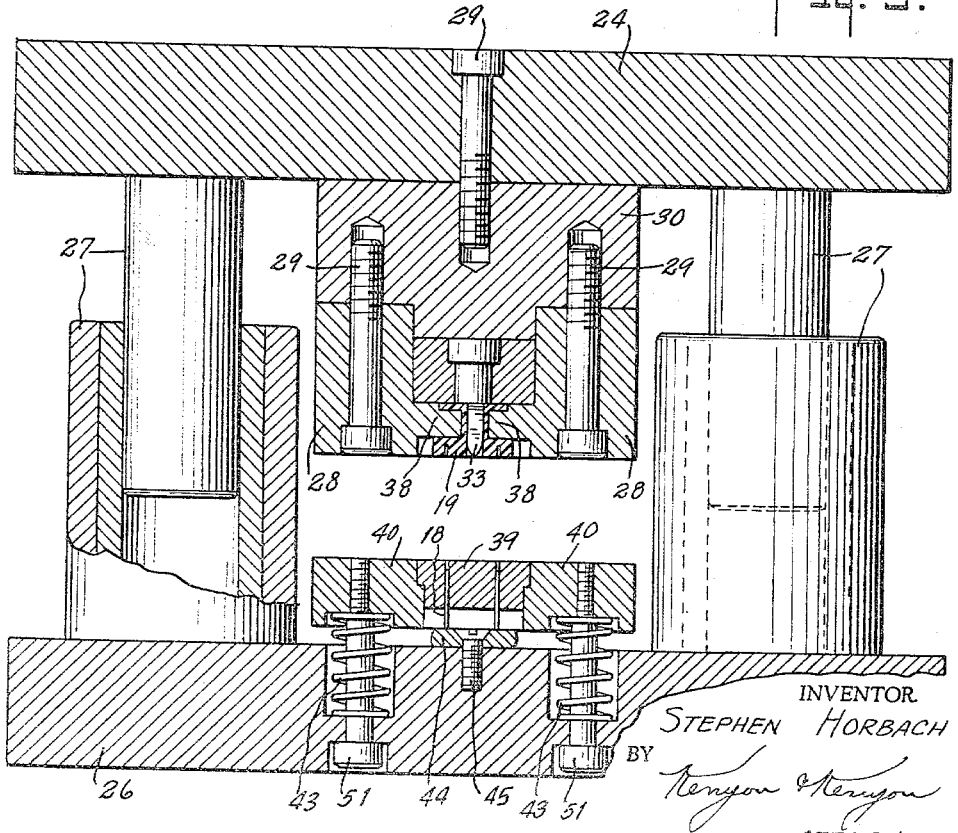

FIG. 1 is an elevation view of a complete pin insertion machine embodying this invention, FIG. 2 is a perspective of a typical bobbin for which the device of FIG. 1 is designed, FIG. 3 is another perspective of the FIG. 2 bobbin, FIG. 4 is a sectional view along the plane 4—4 of FIG. 1, FIG. 5 is a perspective view of the floating support which carries the pin holders, showing the pin holders, in perspective, removed from the floating support, FIG. 6 is a sectional view along the plane 6—6 of FIG. 4, showing full separation between the upper and lower portions of the fixture for holding the bobbin and pins, FIG. 7 is the same sectional view as shown in FIG. 6 except that the upper and lower portions of the fixture have been brought together to a position just prior to entry of pins into the bobbin, FIG. 8 is the same sectional view as FIGS. 6 and 7 except that the upper and lower portions of the fixture are shown in the completely closed position wherein the pins are fully inserted into the bobbins, FIG. 9 is a cross-sectional view along the plane 9—9 of FIG. 6, FIG. 10 is a perspective view of the fixed part of the upper portion of the fixture, and FIG. 11 is a perspective view of the slide for carrying the bobbins.

With reference to FIG. 1, the machine embodying this invention is shown generally as 10. The fixture 11 which holds and aligns the pins and the bobbins is shown at the top of the machine 10. This fixture is shown in greater detail and described in connection with the other figures. FIG. 1 merely shows the relationship between the holding and aligning fixture 11 and the compressed air cylinder 12. The compressed air actuated cylinder 12 is a standard item which is mounted in a frame 13 so that when compressed air is admitted into the cylinder 12, the piston 14 will be forced upwards and will hammer terminal pins into the base of the plastic bobbins held in the positioning and aligning fixture 11. A flow control valve 15 must be used with the compressed air cylinder 12 in order to slow down the speed of the piston 14. The flow control valve 15 is adjustable and has to be adjusted by test in each installation and, at times, as the size of shape or material of the bobbin or other part into which the pins are to be hammered changes.

The fixture 11 itself can be considered to hang from the frame 13 and rest on top of the piston 14. The top plate 24 of the fixture 11 is permanently attached to the frame 13 by means of bolts 25. The bottom plate 26 of the fixture 11 rests on top of the piston 14 and is laterally aligned with the top plate 24 by ball bearing raceways 27. The ball bearing raceway 27 permits the bottom plate 26 to reciprocate up and down relative to the top plate 24 while barring any relative horizontal motion between the bottom piece 26 and the top piece 24. A standard die set may conveniently be used to provide the top plate 24, bottom plate 26 and raceways 27.

FIGS. 2 and 3 simply illustrate a typical bobbin 17 which can be used in this machine 10. The bobbin is designed to have pins 18 (shown dotted) hammered into its base 19.

FIGS. 4 and 6–9 illustrate in greater detail the fixture 11 which holds and positions the bobbins 17 while aligning terminal pins 18 with the pin openings in the base 19 of the bobbin 17.

As may best be seen in FIGS. 9 and 10, two guide blocks 28 are affixed to the top plate 24 by means of bolts 29 and intermediate piece 30. These guide blocks 28 define a channel 31 for a slide 32. The slide 32 (see FIG. 11) is used to insert the bobbin 17 for the pinning operation and to remove the bobbins 17 from the machine once the pins have been inserted. In the embodiment shown, two bobbins 17 may have pins inserted into them at the same time. Accordingly, the slide 32 is shown with two core pins 33. These core pins 33 maintain a friction fit with the core of the bobbins 17 and thus hold the bobbins in place against the force of gravity. As may be seen by comparing FIGS. 6 and 7, the slide 32 can be pulled in and out only when the piston 14 is fully retracted. Guide pins 34 and 35 are carried by the slide 32 to provide alignment when the fixture 11 closes and these pins 34, 35 will hold the slide 32 in unless the fixture 11 is in open position. The guide blocks 28 determine the position of the slide 32 along two axes, the vertical and one horizontal axis. When the slide 32 is fully inserted for machine operation, the position of the slide 30 (and the other horizontal axis) is determined by the shoulder 36 on the guide block 32, which shoulder 36 abuts against the face 37 of the guide blocks 28.

It is an important feature of the guide blocks 28 that they provide a shoulder 38 which backs up the base 19 of the bobbin 17. This shoulder 38 prevents the base 19 from breaking under the force of the hammering on the pins 18.

Below the slide 32 are located pin holders 39 and a floating support 40. The pin holders 39 are held up by a shoulder 41 in the floating support 40 (see esp. FIG. 5). Floating support 40 in turn is held up by springs 42, 43, which springs 42, 43 rest in the bottom plate 26 (see FIG. 6).

As is most clearly seen in FIG. 6, a hammering plate 44 is affixed to the bottom plate 26 by screws 45. When the terminal pins 18 are loaded by hand into the pin holder 38, these terminal pins 18 rest on the hammering plate 44. The thickness of the hammering plate 44 is selected so that the pins 18 will be flush or just beneath the top of the pin holder 39 after they are inserted. The thickness of the pin holder 39 is selected so that the space between the pin holder 39 and the hammering plate 44 at least equals the amount by which the pins 18 are to be hammered into the base 19 of the bobbin 17. That spacing may be varied by the extent to which the pins 18 are below the upper surface of the pin holder 39. However, it is desirable that the pins 18 be held as close to the base 19 of the bobbin 17 as is possible so that the pins 18 will enter the base 19 initially as slowly as possible.

Heavy springs 42 and 43 operate as shock absorbers so that when the bottom plate 26 moves up under the impetus of the piston 14, the springs 42 and 43 will absorb the punch of the bottom piece 26 and ease entry of the pins 18 into the bobbin 17. The springs 42 and 43 will thus absorb a great deal of the momentum and cushion the impact of the pin 18 on the bobbin 17 material. The cushioning effect of these springs 42 and 43 in conjunction with the flow control valve 15 makes it possible to adapt an automatic machine to the hammering of the pins 21 into the bobbin 20.

Openings 48 and 49 in the floating support are adapted to fit the guide pins 34 and 35, respectively, and thus serve to align the floating support and with it the pin holders 39 to the slide 32. In this fashion the pins 18 are aligned with the bobbin 17 prior to hammering the pins into the bobbin.

FIG. 9 best shows how the amount by which the pins 18 are driven is controlled. Stripper bolts 51 pass through the bottom plate 26 and the springs 43 to screw into the floating support 40. The heads of the bolts 51 abut against a downwardly facing recess in the bottom plate 26 and thus limit the upward position of the floating support 40. Thus the floating support 40 is not freely floating but is held down against the springs 43. The bolts 51 are thus adjustable to adjust the space between the floating support 40 and the bottom plate 26. When the bottom plate 26 ascends, under impetus of the piston 14, the springs 42, 43 carry the floating support 40—and with it, the pin holder 39 and pins 18—until the support 40 abuts against the guide blocks 28. At that point, the springs 42, 43 start to compress (absorbing momentum) and continue to compress until the floating support 40 hits against the bottom plate 26. The relative travel between the floating support 40 and the bottom plate 26 is the amount by which the hammering plate 44 can force the pins 18 upwards relative to the pin holder 39. If the pins are loaded flush with the top of the pin holder 39, then that represents the amount by which the pins will travel into the bobbin 17.

The stripper bolts 51 permit relative vertical travel between the floating support 40 and the bottom plate 26 of, in one embodiment, 0.115 inch. Thus when the die set opens, the bottom plate travels down for 0.115 inch at which point it contacts the heads of the stripper bolts 51 and starts to pull down the floating support 40 (and thus the pin holders 39). Since the piston 14 travel is approximately six inches, the bottom die plate 26 will travel the full six inches and the floating support 40 will travel the full six inches less the 0.115 inch clearance between the heads of the stripper bolts 51 and the recessed surface in the die plate 26.

One of the features of this machine is its flexibility in that it may be used with a wide variety of basic pieces into which pins must be hammered. The core pins 33 may be varied and adapted to whatever items it may be wished to carry on the slide 32. In those cases where the scores of the bobbins are circular, a boss or notch will have to be molded or designed into the part and on the core pin 33, or possibly the slide 32 will have to contain a matching boss or the like in order to properly align the part which it is desired to carry on the slide 32. The thickness of the hammering plate 44 and the thickness of the pin holder 39 may both be adjusted to adapt to different length pins 18 and to different amounts by which it is desired to drive the pins 18 into the part carried by the slide 32. In addition the pin holder 39 is replaceable so that any arrangement or deployment of pins 18 that may be desired can be carried by an appropriate holder 39 and accordingly inserted or hammered into the desired part. The guide blocks 28 would normally have to be changed each time a materially different size part is to be worked on. It is important that the guide blocks shoulder 38 provide backup support for the base of the part involved so that the base will not break off under the force of the hammering.

One of the important features of this machine is that its design permits the holding of very close tolerances. The pins 18 have a 13 mil diameter and thus must be aligned with the holes in the bobbin 17 with at the very most a 5 mil tolerance. The problem of lateral alignment thus becomes very critical and the following features of this machine serve to maintain alignment within the maximum permissible limits of approximately 5 mils.

First it should be recognized that the fixture 11 is designed to be held and suspended within a ball bearing die set 24, 26, 27 (such as the Ball Bearing Die Set manufactured by Lempco Products, Inc., of Bedford, Ohio). The top plate 24 of this standard die set is aligned to the bottom plate 26 by means of ball bearings and a raceway 27. This alignment is permanent and serves to assure that the level of the hammering plate 44 will not be askew. More important, is the alignment of the slide 32 to the floating support 40. The guide pins 34 and 35 assure the alignment of the slide 32 to the floating support 40. The slide 32, through the core pin 33, determines the position of the bobbin 17 while the floating support 40 through its positioning of the pin holders 39 determines the lateral position of the pins 18. The position of the slide 32 is in part determined by the top plate 24 of the ball bearing die set so that the alignment of the top plate 24 with the bottom plate 26 assist in aligning the bobbin 17 properly. However, the guide pins 34 and 35 assure that the final alignment of the slide 32 to the floating support 40 will be with a minimum tolerance. During the actual process of bringing the pins up towards the bobbin 17, the openings 48 and 49 in the floating support 40 will first engage the guide pin 35 and then engage the guide pin 34 so that the guide pins 34 and 35 can properly and perfectly align the slide 32 to the floating support 40.

Thus by directly aligning the slide 32 to the floating support 40 through the guide pins 34 and 35 as well as by indirectly aligning the slide 32 to the floating support 40 through the alignment of the top plate 24 and bottom plate 26 of a ball bearing die set, a very accurate ultimate alignment is achieved. Redundant alignment of this sort serves to reduce the tolerance to the desired limit.

What is claimed is:

1. A machine for inserting pins into a bobbin comprising:
   an upper member having a lower surface and including holding means for holding and orienting a bobbin at said upper member,
   a lower member spaced from and reciprocally mounted relative to said upper member, said lower member having an upper surface,
   springs extending upwardly from said upper surface of said lower member,
   a floating plate supported on said springs, said floating plate having a lower surface, an upper surface, a through opening and an upwardly facing shoulder in said opening, said upper surface of said floating plate facing said lower surface of said upper member and adapted to abut against said lower surface of said upper member when said upper and lower members are brought together, said lower surface of said floating plate being spaced from said upper surface of said lower member by a first pre-determined distance,
   a pin holder plate supported on said upwardly facing shoulder within said opening, said pin holder plate having vertical holes therethrough for positioning pins, said pin holder plate having a lower surface, and
   a hammering plate attached to said lower member, said hammering plate having an upper surface facing and spaced from said lower surface of said pin holder plate by a second pre-determined distance, said first pre-determined distance being no greater than said second pre-determined distance,
   whereby pins placed in said vertical holes of said pin holder plate will rest against said upper surface of said hammering plate,
   whereby an upward thrust by said lower member will bring together said upper surface of said floating plate and said lower surface of said upper member and will cause said hammering plate to hammer the pins held by said pin holder plate into whatever bobbin is held by said holding means,
   whereby said springs will absorb a portion of the energy transmitted by said lower member during the hammering of pins into the bobbin,
   whereby said lower surface of said floating plate will abut against said upper surface of said lower member to limit the excursion of said hammering plate to said first pre-determined distance.

2. A machine for inserting pins into a bobbin comprising:
   an upper plate,
   a lower plate spaced from and reciprocally mounted relative to said upper plate, said lower plate having an upper surface,
   a support member removably affixed to said upper plate, said support forming guide rails, said support having a lower surface.
   a slide plate slidably supported on said guide rails,
   a removable core pin attached to and extending downwardly from said slide plate to hold and orient the bobbin below said slide plate,
   springs extending upwardly from said lower plate,
   a floating plate supported on said springs, said floating plate having a lower surface, an upper surface, a central opening and an upwardly facing shoulder in said central opening, said upper surface of said floating plate facing said lower surface of said support member and adapted to abut against said lower surface when said upper and lower plates are brought together, said lower surface of said floating plate being spaced from said upper surface of said lower plate by a first pre-determined distance,
   a pin holder plate supported on said upwardly facing shoulder within said central opening, said pin holder plate having vertical holes therethrough for positioning pins, said pin holder plate having a lower surface, and,
   a hammering plate removably attached to said lower plate, said hammering plate having an upper surface opposed to and spaced from said lower surface of said pin holder plate by a second pre-determined distance, so that pins placed in said vertical holes of said pin holder plate will rest against said hammering plate, said first pre-determined distance being no greater than said second pre-determined distance.

3. The machine of claim 2 wherein said first support includes a shoulder adapted to support said bobbin when said pins are being hammered into said bobbin.

4. The machine of claim 2 further characterized by guide pin means to laterally align said slide plate with said floating plate when said slide plate and said floating plate are closed towards one another.

5. The machine of claim 2 further characterized by means to laterally align said upper and lower plates, said guide rails being adapted to align said slide plate to said upper plate in one lateral direction and guide pin means to laterally align said slide plate with said floating plate when said slide plate and said floating plate are closed towards one another, whereby the holes in said pin holder will be aligned relative to said core pin and thus whatever pins are in said holes would be aligned with whatever article is held by said core pin.

References Cited in the file of this patent
UNITED STATES PATENTS

| | | |
|---|---|---|
| 2,300,785 | Haydon | Nov. 3, 1942 |
| 2,473,509 | Kellogg | June 21, 1949 |
| 2,494,096 | Kellogg | Jan. 10, 1950 |